(12) United States Patent
Poltorak

(10) Patent No.: US 7,996,268 B2
(45) Date of Patent: Aug. 9, 2011

(54) APPARATUS AND METHOD FOR AN ELECTRONIC TELEPHONE WALLET

(76) Inventor: Alexander I. Poltorak, Monsey, NY (US)

( * ) Notice: Subject to any disclaimer, the term of this patent is extended or adjusted under 35 U.S.C. 154(b) by 1429 days.

(21) Appl. No.: 10/378,409

(22) Filed: Mar. 3, 2003

(65) Prior Publication Data

US 2004/0177005 A1    Sep. 9, 2004

(51) Int. Cl.
  *G06Q 30/00* (2006.01)
(52) U.S. Cl. .......... 705/26.1; 705/21; 705/27.1
(58) Field of Classification Search .......... 705/26, 705/26.1–27.2
  See application file for complete search history.

(56) References Cited

U.S. PATENT DOCUMENTS

| | | | |
|---|---|---|---|
| 6,847,816 B1* | 1/2005 | Sarradin | 455/407 |
| 6,873,974 B1* | 3/2005 | Schutzer | 705/41 |
| 7,092,916 B2* | 8/2006 | Diveley et al. | 705/74 |
| 7,356,502 B1* | 4/2008 | LaBadie et al. | 705/38 |
| 2001/0011248 A1* | 8/2001 | Himmel et al. | 705/39 |
| 2001/0037264 A1* | 11/2001 | Husemann et al. | 705/26 |
| 2002/0065774 A1* | 5/2002 | Young et al. | 705/41 |
| 2002/0077993 A1* | 6/2002 | Immonen et al. | 705/77 |
| 2002/0107755 A1* | 8/2002 | Steed et al. | 705/26 |
| 2004/0243477 A1* | 12/2004 | Mathai et al. | 705/26 |
| 2005/0187873 A1* | 8/2005 | Labrou et al. | 705/40 |
| 2006/0253335 A1* | 11/2006 | Keena et al. | 705/26 |

OTHER PUBLICATIONS

Hafner, Katie. Will that be cash or cell phone?; Wireless payment systems might mean dealing into your own wallet. The New York Times, Mar. 2, 2000.*

* cited by examiner

*Primary Examiner* — Jason Dunham
(74) *Attorney, Agent, or Firm* — Anatoly S. Weiser; Acuity Law Group

(57) ABSTRACT

An apparatus and method for providing an electronic wallet device, including a memory device for storing payment identifier information associated with an account holder, a processing device for processing a payment command, wherein the processing device retrieves the payment identifier information from the memory device, and a transmitter for transmitting the payment identifier information to a merchant computer, wherein the merchant computer is associated with a merchant, and further wherein the payment identifier information is utilized in a transaction with the merchant.

25 Claims, 7 Drawing Sheets

APPARATUS AND METHOD FOR AN ELECTRONIC TELEPHONE WALLET

FIELD OF THE INVENTION

The present invention pertains to an apparatus and method for an electronic telephone wallet and/or communication device wallet and, in particular, to an apparatus and method for an electronic telephone wallet and/or communication device wallet which can be utilized in order to store payment identifier information for utilization in a transaction.

BACKGROUND OF THE INVENTION

Many individuals have come to enjoy the convenience and efficiency of making purchases and/or engaging in transactions via a telephone or communication device. Typically, these transactions take place from a location remote from a merchant or store and involve use of a payment means or payment identifier other than cash or physical currency.

For example, an individual making a purchase from a merchant via a telephone or computer typically may be asked to provide a credit card number and/or expiration date, a charge card number and/or expiration date, and/or a card number and/or expiration date. The individual, in some instances, may also be asked to verify personal information such as his or her billing address and/or mailing address.

Providing the above payment identifier information or other personal information can be inconvenient and can, in some instances, create security concerns. The individual may also have to key in or enter any needed information without making a mistake for each transaction. Further, the repeated providing of the above information can lead to an increased probability that the information may be misused and/or misappropriated.

SUMMARY OF THE INVENTION

The present invention pertains to an apparatus and method for an electronic telephone wallet and/or communication device wallet which overcomes the shortfalls of the prior art. The present invention provides an apparatus and method for an electronic telephone wallet and/or communication device wallet which can be utilized in order to store payment identifier information for utilization in a transaction.

The present invention provides an electronic telephone wallet and/or communication device wallet which can be utilized to store payment identifier information which can be utilized in a transaction with a merchant. The payment identifier information can include any one or more of a credit card number, a credit account number, a charge card number, a charge account number, a debit card number, and/or a debit account number. The payment identifier information can also include an expiration date(s) associated with any of the above-described credit cards, charge cards, debit cards, credit accounts, charge accounts, and/or debit accounts.

The payment identifier information can also include information regarding an account holder which can include any one or more of an account holder's name or other identification information, an account holder's address, an account holder's residence information, an account holder's business address information, an account holder's telephone number, a telephone number corresponding to the communication account in conjunction with which the communication device is utilized, an account holder's e-mail address, an account holder's zip code, an account holder's mother's maiden name information, a password, a security code, and/or any other identification information which can be utilized in order to provide for account security for an account utilized for payment in a transaction.

The present invention can also be utilized in order to provide payment identifier information to a merchant computer during a transaction involving a good or a service and/or a purchase of a good or a service. The payment identifier information can then be utilized by the merchant computer in processing the transaction information and/or in consummating the transaction.

The present invention can also be utilized in conjunction with a central processing computer wherein the payment identifier information can be stored at the central processing computer. A user or account holder can access the central processing computer, at any time prior to, during, or subsequent to, a transaction with a merchant computer, in order to effectuate a transmission of the payment identifier information to the merchant computer. The present invention can also be utilized in order to enable a user or account holder to engage in a transaction with a merchant with any telephone or communication device which may or may not have payment identifier information stored therein or thereat.

The apparatus of the present invention includes a communication device which is associated with a user or account holder utilizing the present invention. The communication device can be a telephone, a line-connected telephone, a cordless telephone, a wireless telephone, a cellular telephone, a personal communications services (PCS) device, a computer, a personal computer, a laptop computer, a notebook computer, a hand-held computer, a personal digital assistant, and/or any other personal communication device.

The apparatus of the present invention can also include any number of merchant computers. The merchant computer(s) can be associated with any goods provider and/or services provider. The merchant computer can be utilized in order to process transactions involving any goods and/or services provided by a merchant.

The merchant computer can be any suitable computer, computer system, central processing computer, server, server computer, Internet server computer, and/or network computer.

The communication device can transmit signals and/or information to the merchant computer(s). The communication device can also receive signals and/or information from the merchant computer(s).

The present invention can be utilized on, over, and/or in conjunction with, any suitable communication network or system, including, but not limited to, a telecommunication network, the Internet, the World Wide Web, an RF signal communication network, a satellite communication network, an optical communication network, a public switched telephone network, a digital communication network, a personal communications services (PCS) communication network, a wireless communication network, and/or any other communication network or system, and/or any combination of same.

The communication device can include a central processing unit (CPU), communication equipment for providing the communication capabilities of the respective communication device, a read only memory (ROM) device(s), and a random access memory (RAM) device(s). The communication device can also include a user input device, a display device and an output device.

The communication device can also include a database(s) which can contain any and/or all of the data and/or information which may be needed and/or desired in performing any of the processing routines and/or functionality described herein as being provided by the present invention.

The database can contain information regarding an account holder which can include any one or more of an account holder's name or other identification information, an account holder's address, an account holder's residence information, an account holder's business address information, an account holder's telephone number, telephone number corresponding to the communication account in conjunction with which the communication device is utilized, an account holder's e-mail address, an account holder's zip code, an account holder's mother's maiden name information, a password, a security code, and/or any other identification information which can be utilized in order to provide for account security for an account utilized for payment in a transaction.

The database can also contain payment identifier information for each credit card account, credit account, charge card account, charge account, debit card account, and/or debit account, including, but not limited to, account number, account expiration date, account security code, account personal identification number, account usage password, and/or account usage security code.

The database can also include information regarding any number of merchants including, but not limited to, merchant name, merchant address, merchant telephone number, merchant web site address, merchant e-mail address, etc. The database can also contain a telephone number(s), password information, personal identification information, security code information, and/or any other information for accessing and/or utilizing a central processing computer which can be utilized to store, utilize, and/or transmit, payment identifier information to a respective merchant computer for, or on behalf of, the user or account holder.

The database can also contain any software, software programs, and/or algorithms, for performing any of the processing routines and/or functionality described herein as being performed by the present invention.

The communication device can also include a transmitter for transmitting data and/or information to any one or more of the merchant computers. The communication device can also include a receiver for receiving data and/or information and/or a request for data and/or information, from any one or more of the merchant computer(s).

The present invention can be utilized in order to facilitate any one or more of a credit card purchase, a charge card purchase, and/or a debit card purchase, via a communication device. The payment identifier information can include any one or more of a credit card number, a credit account number, a charge card number, a charge account number, a debit card number, and/or a debit account number. The payment identifier information can also include any applicable expiration date information for the respective account.

The payment identifier information can also include information regarding an account holder which can include any one or more of an account holder's name or other identification information, an account holder's address, an account holder's residence information, an account holder's business address information, an account holder's telephone number, telephone number corresponding to the communication account in conjunction with which the communication device is utilized, an account holder's e-mail address, an account holder's zip code, an account holder's mother's maiden name information, a password, a security code, and/or any other identification information which can be utilized in order to provide for account security for an account utilized for payment in a transaction.

The present invention can be utilized in order to transmit the pertinent payment identifier information from the communication device to a merchant computer during a transaction involving a good or a service and/or a purchase of a good or a service. The payment identifier information can then be utilized by the merchant computer in processing the transaction information and/or in consummating the transaction.

The merchant computer can receive and process the payment identifier information in conjunction with information regarding the corresponding transaction. In this manner, the present invention can be utilized in order to dispense with the need for a user or account holder having to enter and/or input payment identifier information into the communication device.

The user or account holder can manually enter a command into the communication device in order to transmit the payment identifier information to the merchant computer and/or the communication device can be programmed to automatically transmit the payment identifier information to the merchant computer.

The payment identifier information which is transmitted from the communication device to the merchant computer can, for example, include a user's name, credit account number, charge account expiration date, mailing address, security code, and/or any other payment identifier information.

The apparatus of the present invention can also be utilized in conjunction with, and can include, a central processing computer wherein the central processing computer can store payment identifier information for any number of accounts and for any number of users or account holders. A user or account holder can utilize the apparatus and method of the present invention from a home phone or home communication device so as to ensure enhanced security for the transaction. The user or account holder can also utilize the present invention when using a telephone other than a home phone or home communication device, such as, for example, a public telephone, a public computer, and/or a third party telephone or third party communication device.

The user or account holder can also utilize the central processing computer in order to access and/or to provide his or her payment identifier information during a transaction. The central processing computer can also transmit the payment identifier information to a merchant computer for, or on behalf of, the user or account holder.

The central processing computer can be a telephone company computer, a telephone company central processing computer, a central switching or call processing computer, a communication company computer, a communication company central processing computer, and/or a central switching or communication processing computer, which can process respective telephone calls or communication transactions.

The central processing computer can also be a mailbox-type processing computer which can be accessed by the communication device in order to obtain any of the payment identifier information and/or security information described herein.

The central processing computer can also be any suitable computer, computer system, central communication device, server, server computer, Internet server computer, and/or network computer.

The communication device can transmit signals and/or information to the central processing computer as well as receive signals and/or information from the central processing computer. The communication device can also transmit signals and/or information to the merchant computer as well as receive signals and/or information from the merchant computer. The central processing computer can also transmit signals and/or information to the merchant computer as well as receive signals and/or information from the merchant computer.

The central processing computer can include a central processing unit (CPU), a read only memory (ROM) device(s), a random access memory device(s) (RAM), an input device and a display device. The central processing computer can also include an output device.

The central processing computer can also include a database(s) which can contain any and/or all of the data and/or information which may be needed and/or desired in performing any of the processing routines and/or functionality described herein as being provided by the apparatus and method of the present invention.

The central processing computer database can also contain information regarding any number of account holders. The account holder information can include any one or more of an account holder's name or other identification information, an account holder's address, an account holder's residence information, an account holder's business address information, an account holder's telephone number, telephone number corresponding to the communication account in conjunction with which the communication device is utilized, an account holder's e-mail address, an account holder's zip code, an account holder's mother's maiden name information, a password, a security code, and/or any other identification information which can be utilized in order to provide for account security for an account utilized for payment in a transaction.

The central processing computer database can also contain payment identifier information for each credit card account, credit account, charge card account, charge account, debit card account, and/or debit account, including, but not limited to, account number, account expiration date, account security code, account personal identification number, account usage password, and/or account usage security code, for any number and/or types of accounts and for any number of users or account holders.

The central processing computer database can also include information regarding any number of merchants in conjunction with which the present invention can be utilized including, but not limited to, merchant name, merchant address, merchant telephone number, merchant web site address, merchant e-mail address, etc. The central processing computer database can also contain a telephone number(s), password information, personal identification information, security code information, and/or any other information for accessing and/or utilizing a central processing computer which can be utilized to store, utilize, and/or transmit, payment identifier information to any respective merchant computer for, or on behalf of, the user or account holder.

The central processing computer database can also contain any software, software programs, and/or algorithms, for performing any of the processing routines and/or functionality described herein as being performed by the central processing computer and/or the present invention.

The central processing computer can also include a transmitter for transmitting data and/or information to any one or more of the merchant computers and/or to any of the communication devices. The central processing computer can also include a receiver for receiving data and/or information from any one or more of the communication devices and/or merchant computer(s).

The present invention can be utilized in conjunction with the central processing computer in order to facilitate any one or more of a credit card purchase, a charge card purchase, and/or a debit card purchase, from a communication device.

The present invention can also be utilized in order to transmit a payment command signal from a communication device to a central processing computer during a transaction involving a good or a service and/or a purchase of a good or a service. The central processing computer can then identify the pertinent payment identifier information and transmit the payment identifier information to the merchant computer. The payment identifier information can then be utilized by the merchant computer in processing the transaction information and/or in consummating the transaction.

The central processing computer can be employed in conjunction with the communication device in order to introduce an additional layer of security into the transaction. The central processing computer can also be employed by a user or account holder who may desire to engage in a transaction with a merchant from a telephone or communication device which is not his or her communication device.

The merchant computer can process the payment identifier information received from the central processing computer in conjunction with information regarding the corresponding transaction. In this manner, the present invention can dispense with the need for a user or account holder to have to use his or her communication device during the transaction and/or dispenses with the need for a user or account holder having to enter and/or input payment identifier information into the communication device.

The user or account holder can manually enter a payment command into the communication device and transmit same to the central processing computer. The central processing computer can thereafter transmit any pertinent payment identifier information to the merchant computer. The central processing computer can also be programmed to automatically transmit the payment identifier information to the merchant computer.

The payment identifier information transmitted from the central processing computer to the merchant computer can include a user's name, an account number, an account expiration date, a mailing address, a security code, and/or any other payment identifier information.

Accordingly, it is an object of the present invention to provide an apparatus and method for an electronic telephone wallet and/or communication device wallet.

It is another object of the present invention to provide an apparatus and method for an electronic telephone wallet and/or communication device wallet which can be utilized in order to store and/or provide payment identifier information.

It is still another object of the present invention to provide an apparatus and method for an electronic telephone wallet and/or communication device wallet which can be utilized in order to store payment identifier information for utilization in a transaction.

It is yet another object of the present invention to provide an apparatus and method for an electronic telephone wallet and/or communication device wallet which can be utilized in order to provide payment identifier information for utilization in a transaction.

It is another object of the present invention to provide an apparatus and method for an electronic telephone wallet and/or communication device wallet which can be utilized in order to store and/or provide payment identifier information for utilization in a transaction with a merchant.

It is still another object of the present invention to provide an apparatus and method for an electronic telephone wallet and/or communication device wallet which can be utilized in order to store and/or provide payment identifier information for utilization in a transaction involving a good or a service and/or a purchase of a good or a service.

It is yet another object of the present invention to provide an apparatus and method for an electronic telephone wallet and/or communication device wallet which can be utilized in order to store and/or provide payment identifier information which can be utilized by a merchant computer in processing the transaction information and/or in consummating the transaction.

It is another object of the present invention to provide an apparatus and method for an electronic telephone wallet and/or communication device wallet which can be utilized in conjunction with a central processing computer.

It is still another object of the present invention to provide an apparatus and method for an electronic telephone wallet and/or communication device wallet which can be utilized in conjunction with a central processing computer, wherein the payment identifier information can be stored at the central processing computer.

It is yet another object of the present invention to provide an apparatus and method for an electronic telephone wallet and/or communication device wallet which can be utilized in conjunction with a central processing computer, wherein the central processing computer can provide the payment identifier information to a merchant computer.

It is another object of the present invention to provide an apparatus and method for an electronic telephone wallet and/or communication device wallet which can be utilized in order to enable a user or account holder to engage in a transaction with a merchant with any telephone or communication device.

It is still another object of the present invention to provide an apparatus and method for an electronic telephone wallet and/or communication device wallet which can be utilized in order to enable a user or account holder to engage in a transaction with a merchant via a third party telephone or a third party communication device.

It is yet another object of the present invention to provide an apparatus and method for an electronic telephone wallet and/or communication device wallet which can be utilized in order to enable a user or account holder to engage in a transaction with a merchant with any telephone or communication device which may or may not have payment identifier information stored therein or thereat.

It is another object of the present invention to provide an apparatus and method for an electronic telephone wallet and/or communication device wallet which can be utilized on, over, and/or in conjunction with, a communication network or system.

It is still another object of the present invention to provide an apparatus and method for an electronic telephone wallet and/or communication device wallet which can be utilized on, over, and/or in conjunction with, a telecommunication network, the Internet, the World Wide Web, an RF signal communication network, a satellite communication network, an optical communication network, a public switched telephone network, a digital communication network, a personal communications services (PCS) communication network, a wireless communication network, and/or any other communication network or system, and/or any combination of same.

It is yet another object of the present invention to provide an apparatus and method for an electronic telephone wallet and/or communication device wallet which can be utilized in order to facilitate any one or more of a credit card purchase, a credit account purchase, a charge card purchase, a charge account purchase, a debit card purchase, and/or a debit account purchase, via a communication device.

It is another object of the present invention to provide an apparatus and method for an electronic telephone wallet and/or communication device wallet which can dispense with the need for a user or account holder having to enter and/or input payment identifier information into a communication device.

It is still another object of the present invention to provide an apparatus and method for an electronic telephone wallet and/or communication device wallet which can allow a user or account holder to manually enter a command into a communication device for transmission to a merchant computer.

It is yet another object of the present invention to provide an apparatus and method for an electronic telephone wallet and/or communication device wallet which can be programmed to automatically transmit payment identifier information to a merchant computer.

It is another object of the present invention to provide an apparatus and method for an electronic telephone wallet and/or communication device wallet which can be utilized in order to provide enhanced security for a transaction.

It is still another object of the present invention to provide an apparatus and method for an electronic telephone wallet and/or communication device wallet which can be utilized in conjunction with a central processing computer which can transmit payment identifier information to a merchant computer for, or on behalf of, a user or account holder.

It is yet another object of the present invention to provide an apparatus and method for an electronic telephone wallet and/or communication device wallet which can be utilized in conjunction with a central processing computer in order to facilitate any one or more of a credit card purchase, a credit account purchase, a charge card purchase, a charge account purchase, a debit card purchase, and/or a debit account purchase, via a communication device.

It is another object of the present invention to provide an apparatus and method for an electronic telephone wallet and/or communication device wallet which can be utilized in conjunction with a central processing computer, wherein the central processing computer can be programmed to automatically transmit payment identifier information to a merchant computer.

Other objects and advantages of the present invention will be apparent to those skilled in the art upon a review of the Description Of The Preferred Embodiments taken in conjunction with the Drawings which follow.

DESCRIPTION OF THE PREFERRED EMBODIMENTS

Figure 1:
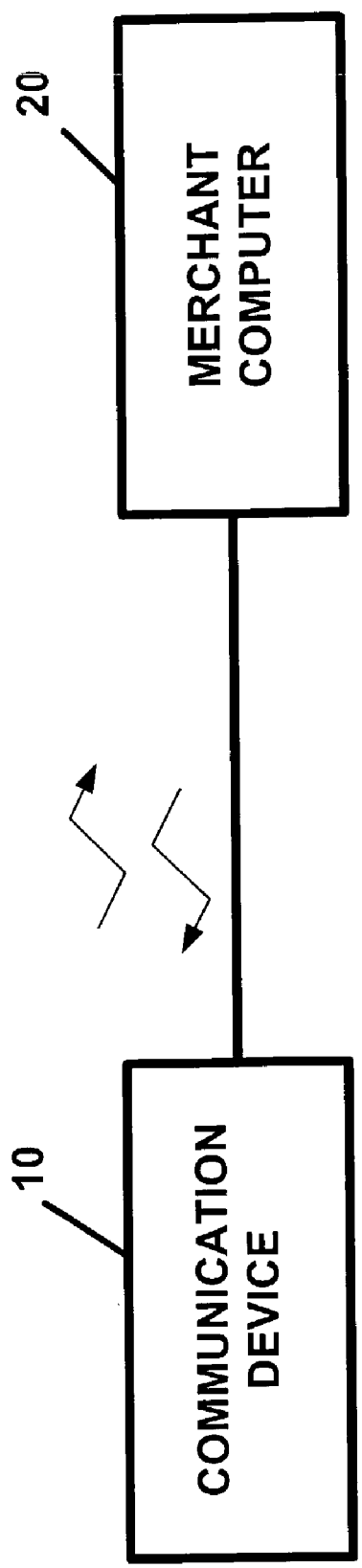
FIG. 1 illustrates a preferred embodiment of the apparatus of the present invention, in block diagram form.

The present invention pertains to an apparatus and method for an electronic telephone wallet and/or communication device wallet. The present invention provides an apparatus and method for an electronic telephone wallet and/or communication device wallet which can be utilized in order to store payment identifier information for utilization in a transaction.

In a preferred embodiment, the apparatus and method of the present invention provides an electronic telephone wallet and/or communication device wallet which can be utilized to store payment identifier information which can be utilized in a transaction with a merchant. The payment identifier information can include any one or more of a credit card number, a credit account number, a charge card number, a charge account number, a debit card number, and/or a debit account number. The payment identifier information can also include an expiration date(s) associated with any of the above-described credit cards, charge cards, debit cards, credit accounts, charge accounts, and/or debit accounts.

The payment identifier information can also include information regarding an account holder which can include any one or more of an account holder's name or other identification information, an account holder's address, an account holder's residence information, an account holder's business address information, an account holder's telephone number, a telephone number corresponding to the communication account in conjunction with which the communication device is utilized, an account holder's e-mail address, an account holder's zip code, an account holder's mother's maiden name information, a password, a security code, and/or any other identification information which can be utilized in order to provide for account security for an account utilized for payment in a transaction.

In a preferred embodiment, the apparatus and method of the present invention can be utilized in order to provide payment identifier information to a merchant computer during a transaction involving a good or a service and/or a purchase of a good or a service. The payment identifier information can then be utilized by the merchant computer in processing the transaction information and/or in consummating the transaction.

In another preferred embodiment, the apparatus and method of the present invention can be utilized in conjunction with a central processing computer wherein the payment identifier information can be stored at the central processing computer. An account holder can access the central processing computer, at any time prior to, during, or subsequent to, a transaction with a merchant computer, in order to effectuate a transmission of the payment identifier information to the merchant computer. In this manner, the present invention provided an apparatus and a method for enabling an account holder to engage in a transaction with a merchant computer with any telephone or communication device which may or may not have payment identifier information stored therein or thereat.

FIG. 1 illustrates a preferred embodiment of the apparatus of the present invention, which is designated generally by the reference numeral 100, in block diagram form. With reference to FIG. 1, the apparatus 100 includes a communication device 10 which is associated with a user or an account holder who utilizes the apparatus and method of the present invention.

In a preferred embodiment, the communication device can be a telephone, a line-connected telephone, a cordless telephone, a wireless telephone, a cellular telephone, and/or a personal communications services (PCS) device. In another preferred embodiment, the communication device 10 can be a computer, a personal computer, a laptop computer, a notebook computer, a hand-held computer, a personal digital assistant, and/or any other personal communication device.

With reference to FIG. 1, the apparatus 100 can also include any number of merchant computers 20. The merchant computer 20 can be associated with any goods provider and/or services provider. The merchant computer 20 can be utilized in order to process a transaction involving any goods and/or services provided by a merchant.

In a preferred embodiment, the merchant computer 20 can be any suitable computer, computer system, central processing computer, server, server computer, Internet server computer, and/or network computer.

In a preferred embodiment, the communication device 10 can transmit signals and/or information to the merchant computer(s) 20. In a preferred embodiment, the communication device 10 can receive signals and/or information from the merchant computer(s) 20. In this manner, the communication device 10 and the merchant computer(s) 20 can communicate with each other in a bi-directional manner.

In a preferred embodiment, the apparatus 100 and method of the present invention can be utilized on, over, and/or in conjunction with, any suitable communication network or system, including, but not limited to, a telecommunication network, the Internet, the World Wide Web, an RF signal communication network, a satellite communication network, an optical communication network, a public switched telephone network, a digital communication network, a personal communications services (PCS) communication network, a wireless communication network, and/or any other communication network or system, and/or any combination of same.

Figure 2:
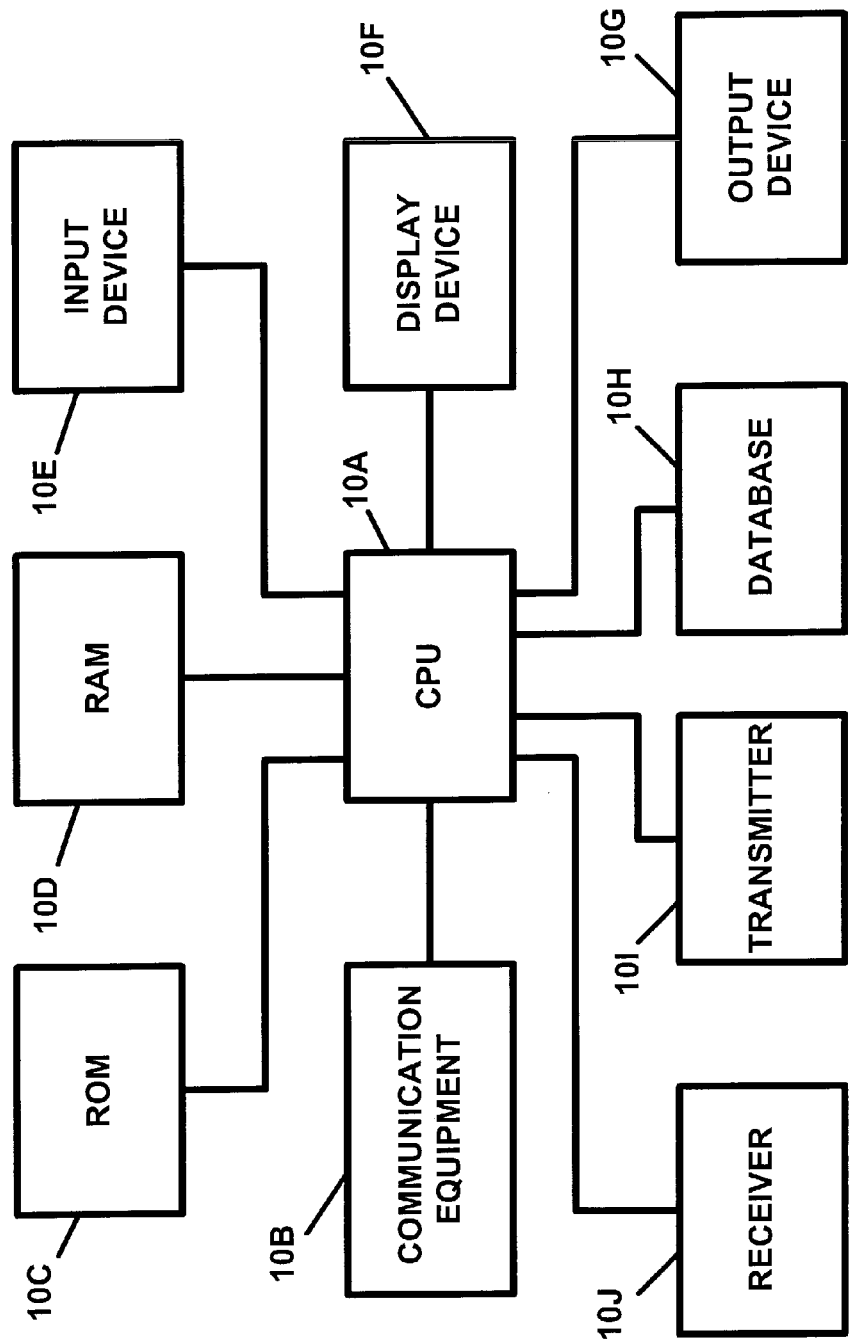
FIG. 2 illustrates a preferred embodiment of the communication device of FIG. 1, in block diagram form.

FIG. 2 illustrates a preferred embodiment of the communication device 10 of FIG. 1, in block diagram form. With reference to FIG. 2, the communication device 10 includes a central processing unit (CPU) 10A which can perform any and all of the processing routines and/or functionality described herein as being provided by the communication device 10 and/or the apparatus 100 of the present invention.

In a preferred embodiment, the communication device 10 can also include communication equipment 10B for providing the communication capabilities of the respective communication device.

In a preferred embodiment, wherein the communication device 10 is a telephone, a line-connected telephone, a cordless telephone, a wireless telephone, a cellular telephone, and/or a personal communications services (PCS) device, the communication equipment 10B can include any of the respective telecommunication devices and equipment, antennas, transmitters, receivers, dial pads, input devices, microphones, speakers, displays, output devices, power supplies, etc., typically found in telephones, line-connected telephones, cordless telephones, wireless telephones, cellular telephones, and/or personal communications services (PCS) devices.

In another preferred embodiment, wherein the communication device 10 is a computer, a personal computer, a laptop computer, a notebook computer, a hand-held computer, and/or a personal digital assistant, the communication equipment 10B can include the various processing devices, memory devices, peripheral devices, input devices, display devices, output devices, microphones, speakers, modems, transmitters, receivers, and/or power supplies, typically found in computers, personal computers, laptop computers, notebook computers, hand-held computers, and/or personal digital assistants.

With reference to FIG. 2, the communication device 10 can also include a read only memory device(s) (ROM) 10C and a random access memory device(s) (RAM) 10D, each of which is connected to the central processing unit 10A.

The communication device 10 can also include a user input device 10E, for entering data and/or commands into the communication device 10, and which can include any one or more of a keyboard, a scanner, a user pointing device, such as, for example, a mouse, and/or a touch pad, which input device(s) 10E is also connected to the central processing unit 10A. The communication device 10 can also include a display device 10F for displaying data and/or information to a user or account holder. The communication device 10 can also include an output device 10G, such as a printer or other output device for providing data and/or information to the user or account holder.

The communication device 10 can also include a database(s) 10H which can contain any and/or all of the data and/or information which may be needed and/or desired in performing any of the processing routines and/or functionality described herein as being provided by the apparatus and method of the present invention.

In a preferred embodiment, the database 10H can contain information regarding an account holder which can include any one or more of an account holder's name or other identification information, an account holder's address, an account holder's residence information, an account holder's business address information, an account holder's telephone number, a telephone number corresponding to the communication account in conjunction with which the communication device is utilized, an account holder's e-mail address, an account holder's zip code, an account holder's mother's maiden name information, a password, a security code, and/or any other identification information which can be utilized in order to provide for account security for an account utilized for payment in a transaction.

The database 10H, in the preferred embodiment, can also contain payment identifier information for each credit card account, credit account, charge card account, charge account, debit card account, and/or debit account, including, but not limited to, account number, account expiration date, account security code, account personal identification number, account usage password, and/or account usage security code.

The database 10H can also include information regarding any number of merchants in conjunction with which the apparatus 100 and method of the present invention can be utilized including, but not limited to, merchant name, merchant address, merchant telephone number, merchant web site address, and/or merchant e-mail address, etc. The database 10H can also contain a telephone number(s), password information, personal identification information, security code information, and/or any other information for accessing and/or utilizing a central processing computer, which can be utilized to store, utilize, and/or transmit, payment identifier information to any respective merchant computer 20 for, or on behalf of, the user or account holder.

The database 10H can also contain any software, software programs, and/or algorithms, for performing any of the processing routines and/or functionality described herein as being performed by the apparatus 100.

The communication device 10 can also include a transmitter 10I for transmitting data and/or information, including any of the herein-described payment identifier information, and/or any other information described herein as being provided by the communication device 10, to any one or more of the herein-described merchant computers 20. The transmitter 10I can also be connected to the CPU 10A.

The communication device 10 can also include a receiver 10J for receiving data and/or information, and/or a request for data and/or information, from any one or more of the herein-described merchant computer(s) 20. The receiver 10J can also be connected to the CPU 10A.

In a preferred embodiment, the apparatus and method of the present invention can be utilized in order to facilitate any one or more of a credit card purchase, a charge card purchase, and/or a debit card purchase from a communication device 10 such as a telephone, line-connected telephone, a cordless telephone, a wireless telephone, a cellular telephone, a personal computer, a personal digital assistant, and/or any other of the communication devices 10 described herein and/or any equivalents thereof.

In a preferred embodiment, the payment identifier information can include any one or more of a credit card number, a credit account number, a charge card number, a charge account number, a debit card number, a debit account number, and/or an expiration date.

The payment identifier information can also include information regarding an account holder which can include any one or more of an account holder's name or other identification information, an account holder's address, an account holder's residence information, an account holder's business address information, an account holder's telephone number, a telephone number corresponding to the communication account in conjunction with which the communication device is utilized, an account holder's e-mail address, an account holder's zip code, an account holder's mother's maiden name information, a password, a security code, and/or any other identification information which can be utilized in order to provide for account security for an account utilized for payment in a transaction.

In a preferred embodiment, the apparatus and method of the present invention can be utilized in order to transmit the pertinent payment identifier information from the communication device 10 to a merchant computer 20 during a transaction involving a good or a service and/or a purchase of a good or a service. The payment identifier information can then be utilized by the merchant computer 20 in processing the transaction information and/or in consummating the transaction.

In a preferred embodiment, the communication device 10 can utilize a software program, an algorithm, and/or an applet, in order to retrieve the pertinent payment identifier information from the database 10H and to transmit same to the merchant computer 20.

The merchant computer 20 can receive and process the payment identifier information in conjunction with information regarding the corresponding transaction. In this manner, the apparatus and method of the present invention dispenses with the need for a user or account holder having to enter and/or input payment identifier information into the communication device 10. In this manner, the present invention can be utilized to provide an electronic telephone wallet and/or a communication device wallet.

In a preferred embodiment, the user or account holder can manually enter a payment command into the communication device 10. The payment identifier information can then be transmitted from the communication device 10 to the merchant computer 20. In another preferred embodiment, the communication device 10 can be programmed to automatically transmit the payment identifier information to the merchant computer 20.

The payment identifier information which is transmitted from the communication device 10 to the merchant computer 20 can, for example, include a user's name, credit card number or credit account number, credit card expiration date or credit account expiration date, mailing address, security code, and/or any other payment identifier information described herein. Payment identifier information can also include a user's name, charge card number or charge account number, charge card expiration date or charge account expiration date, mailing address, security code, and/or any other payment identifier information described herein. Payment identifier information can also include a user's name, debit card number or debit account number, debit card expiration date or debit account expiration date, mailing address, security code, and/or any other payment identifier information described herein.

Figure 3:
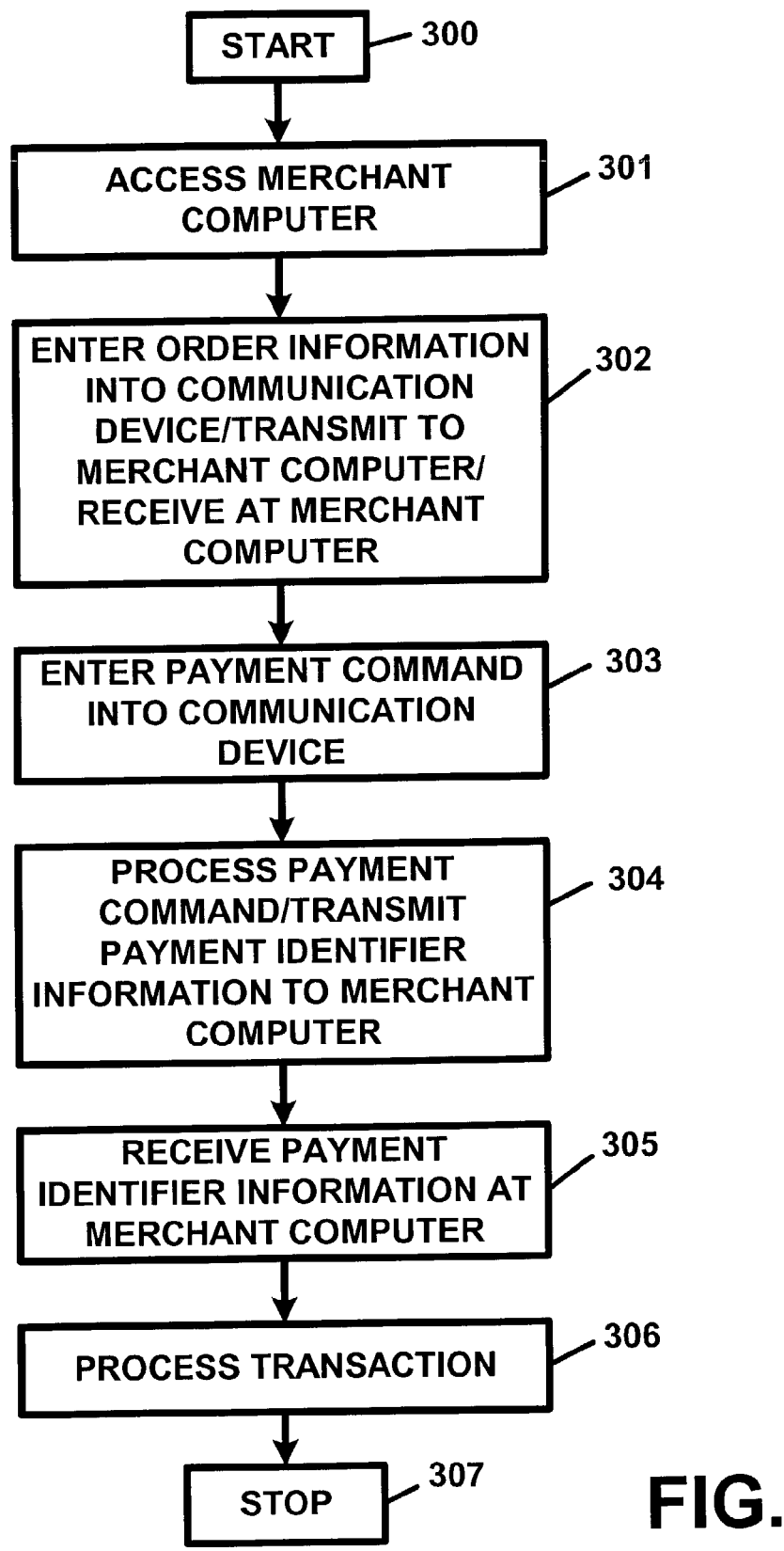
FIG. 3 illustrates a preferred embodiment method for utilizing the apparatus of the present invention, in flow diagram form.

FIG. 3 illustrates a preferred embodiment method for utilizing the apparatus 100 of the present invention, in flow diagram form. With reference to FIG. 3, the operation of the apparatus 100 commences at step 300.

At step 301, the user or account holder can access the merchant computer 20 with the communication device 10. At step 302, the user or account holder can enter order information regarding any good and/or service which he or she desires to order or purchase, into the communication device 10. At step 302, the communication device 10 can also process the entered order information. At step 302, the communication device 10 can transmit the order information to the merchant computer 20. At step 302, the merchant computer 20 can receive and process the order information.

At step 303, the user or account holder can enter payment command information into the communication device 10. For example, a user, at step 303, can select a method of payment (i.e. credit, charge, debit, etc.) and an account which is to be utilized. At step 304, the communication device 10 can process the payment command information, identify the pertinent payment identifier information, and retrieve the pertinent payment identifier information from the database 10H. At step 304, the communication device 10 can also transmit the payment identifier information to the merchant computer 20.

At step 305, the merchant computer 20 can receive the payment identifier information. At step 306, the merchant computer 20 can process the payment identifier information in conjunction with processing and/or consummating the transaction. Thereafter, the operation of the apparatus 100 will cease at step 307.

In another preferred embodiment, the apparatus and method of the present invention can be utilized in conjunction with a central processing computer wherein the central processing computer can store payment identifier information for any number of accounts and for any number of users or account holders. In one preferred embodiment, a user or account holder can utilize the apparatus and method of the present invention with the communication device 10 so as to ensure enhanced security for the transaction.

In another preferred embodiment, the user or account holder can utilize the apparatus and method of the present invention with a telephone or communication device such as, for example, a public telephone, a public computer, and/or a third party telephone or third party communication device.

In a preferred embodiment, wherein the apparatus of the present invention is utilized in conjunction with a central processing computer, a user or account holder can utilize the central processing computer in order to access and provide his or her payment identifier information to a merchant computer 20 during a transaction. The central processing computer can transmit the payment identifier information to a merchant computer 20 for, or on behalf of, the user or account holder.

Figure 4:
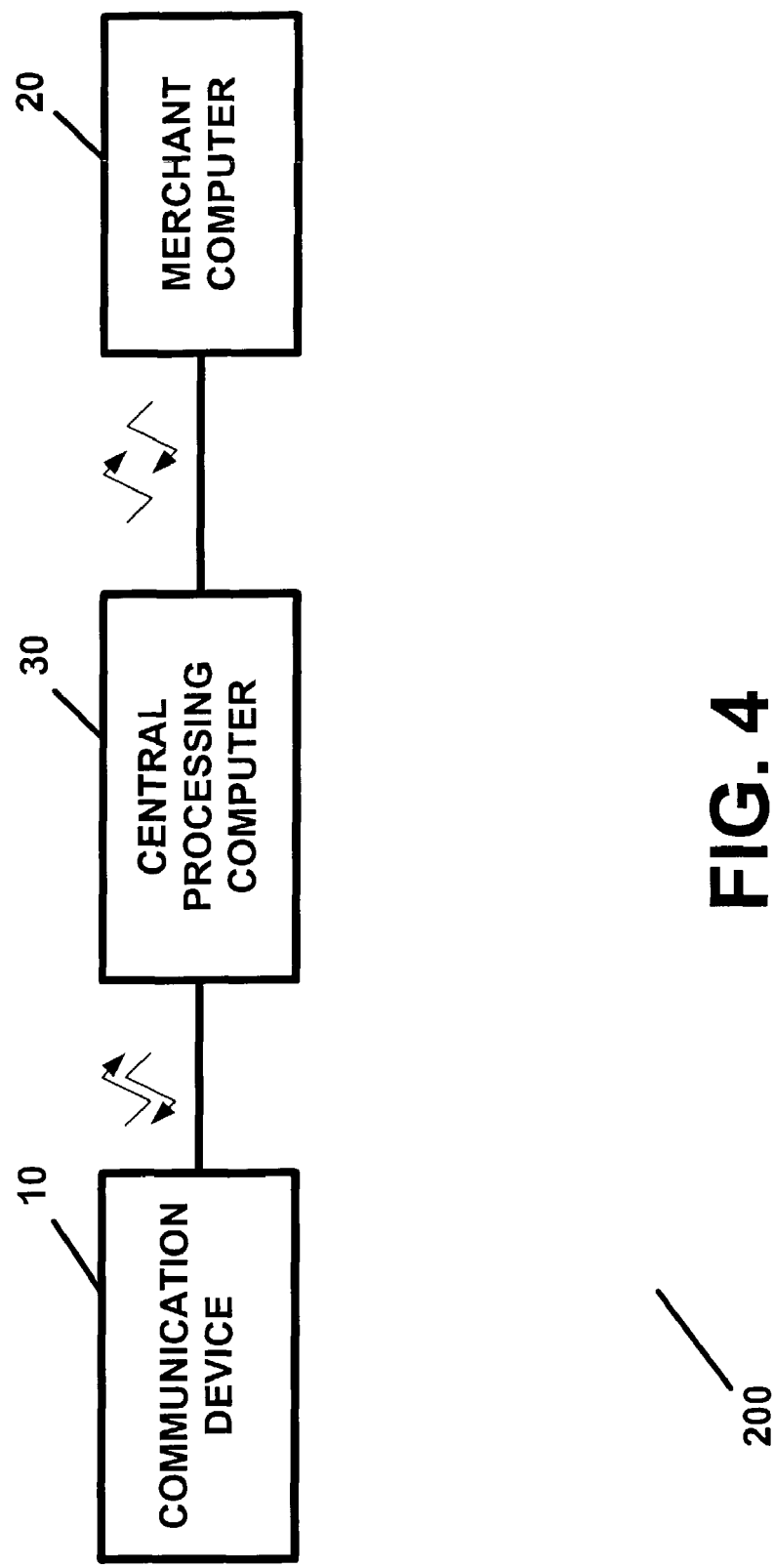
FIG. 4 illustrates another preferred embodiment of the apparatus of the present invention, in block diagram form.

FIG. 4 illustrates another preferred embodiment of the apparatus of the present invention, which is designated generally by the reference numeral 200, in block diagram form. With reference to FIG. 4, the apparatus 200 can include the communication device(s) 10 and merchant computer(s) 20 described herein in conjunction with the embodiment of FIG. 1.

The communication device 10 can be any one or more of the communication devices described herein. In this regard, in a preferred embodiment, the communication device 10 can be any one or more of a telephone, a line-connected telephone, a cordless telephone, a wireless telephone, a cellular telephone, a personal communications services (PCS) device, a computer, a personal computer, a laptop computer, a notebook computer, a hand-held computer, and/or a personal digital assistant. In the preferred embodiment of FIG. 4, the communication device 10 can include any and/or all or the components described and illustrated in FIG. 2.

In a preferred embodiment, the merchant computer 20 of the apparatus 200, can be any suitable computer, computer system, central processing computer, server, server computer, Internet server computer, and/or network computer.

With reference once again to FIG. 4, the apparatus 200 can also include a central processing computer 30. In the preferred embodiment of FIG. 4, the central processing computer 30 can be a telephone company computer, a telephone company central processing computer, a central switching or call processing computer, a communication company computer, a communication company central processing computer, and/or a central switching or communication processing computer, which can process respective telephone calls or communication transactions.

In another preferred embodiment, the central processing computer 30 can be a mailbox-type processing computer which can be accessed by the communication device 10 in order to obtain any of the payment identifier information and/or security information described herein.

In another preferred embodiment, the central processing computer 30 can be any suitable computer, computer system, central processing computer, server, server computer, Internet server computer, and/or network computer.

In the preferred embodiment, the communication device 10 can transmit signals and/or information to the central processing computer 30 as well as receive signals and/or information from the central processing computer 30. In the preferred embodiment, the communication device 10 can also transmit signals and/or information to the merchant computer 20 as well as receive signals and/or information from the merchant computer 20. In the preferred embodiment, the central processing computer 30 can also transmit signals and/or information to the merchant computer 20 as well as receive signals and/or information from the merchant computer 20.

In this manner, the communication device 10 and the central processing computer 30 can communicate with each other in a bi-directional manner. The communication device 10 and the merchant computer 20 can communicate with each other in a bi-directional manner. The merchant computer 20 and the central processing computer 30 can also communicate with each other in a bi-directional manner.

In a preferred embodiment, the apparatus 200 and method of the present invention can be utilized on, over, and/or in conjunction with, any suitable communication network or system, including, but not limited to, a telecommunication network, the Internet, the World Wide Web, an RF signal communication network, a satellite communication network, an optical communication network, a public switched telephone network, a digital communication network, a personal communications services (PCS) communication network, a wireless communication network, and/or any other communication network or system, and/or any combination of same.

Figure 5:
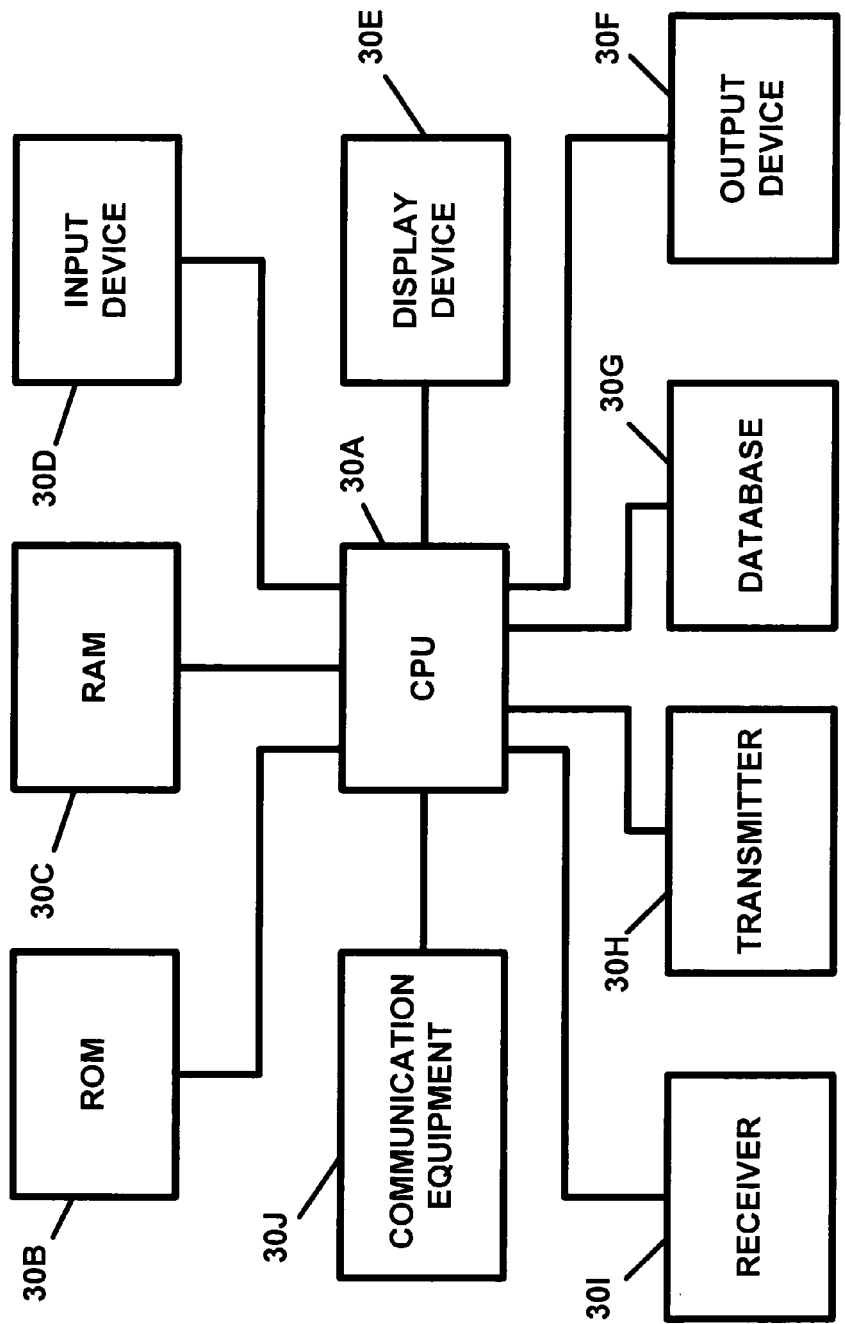
FIG. 5 illustrates a preferred embodiment of the central processing computer of FIG. 4, in block diagram form.

FIG. 5 illustrates a preferred embodiment of the central processing computer 30 of FIG. 4, in block diagram form. With reference to FIG. 5, the central processing computer 30 includes a central processing unit (CPU) 30A which can perform any and all of the processing routines and/or functionality described herein as being provided by the central processing computer 30 and/or the apparatus 200.

In a preferred embodiment, the central processing computer 30 can include a read only memory device(s) (ROM) 30B and a random access memory device(s) (RAM) 30C, each of which is connected to the central processing unit 30A.

The central processing computer 30 can also include an input device 30D, for entering data and/or commands into the central processing computer 30, and which can include any one or more of a keyboard, a scanner, a user pointing device, such as, for example, a mouse, and/or a touch pad, which input device(s) 30D is also connected to the central processing unit 30A. The central processing computer 30 can also include a display device 30E for displaying data and/or information. The central processing computer 30 can also include an output device 30F, such as a printer or other output device, for providing data and/or information to a user or operator.

The central processing computer 30 can also include a database(s) 30G which can contain any and/or all of the data and/or information which may be needed and/or desired in performing any of the processing routines and/or functionality described herein as being provided by the apparatus and method of the present invention.

In a preferred embodiment, the database 30G can contain information regarding any number of account holders. The account holder information can include any one or more of an account holder's name or other identification information, an account holder's address, an account holder's residence information, an account holder's business address information, an account holder's telephone number, a telephone number corresponding to the communication account in conjunction with which the communication device is utilized, an account holder's e-mail address, an account holder's zip code, an account holder's mother's maiden name information, a password, a security code, and/or any other identification information which can be utilized in order to provide for account security for an account utilized for payment in a transaction.

The database 30G, in the preferred embodiment, can also contain payment identifier information for each credit card account, credit account, charge card account, charge account, debit card account, and/or debit account, including, but not limited to, account number, account expiration date, account security code, account personal identification number, account usage password, and/or account usage security code, for any number and/or types of accounts and for any number of users or account holders.

The database 30G can also include information regarding any number of merchants in conjunction with which the apparatus 200 and method of the present invention can be utilized, including but not limited to merchant name, merchant address, merchant telephone number, merchant web site address, merchant e-mail address, etc. The database 30G can also contain a telephone number(s), password information, personal identification information, security code information, and/or any other information for accessing and/or utilizing the central processing computer 30, which can be utilized to store, utilize, and/or transmit, payment identifier information to any respective merchant computer 20 for, or on behalf of, the user or account holder.

The database 30G can also contain any software, software programs, and/or algorithms, for performing any of the processing routines and/or functionality described herein as being performed by the central processing computer 30 and/or the apparatus 200.

The central processing computer 30 can also include a transmitter 30H for transmitting data and/or information, including any of the herein-described payment identifier information, and/or any other information, from the central processing computer 30 to any one or more of the herein-described merchant computers 20. The transmitter 30H can also transmit data and/or information to any of the communication devices 10. The transmitter 30H can also be connected to the CPU 30A.

The central processing computer 30 can also include a receiver 30I for receiving data and/or information from any one or more of the herein-described communication devices 10 and/or from any one or more of the merchant computer(s) 20. The receiver 30I can also be connected to the CPU 30A. The central processing computer 30 also includes communication equipment 30J.

In another preferred embodiment, the apparatus 200 and method of the present invention can be utilized in conjunction with the central processing computer 30 in order to facilitate any one or more of a credit card purchase, a credit account purchase, a charge card purchase, a charge account purchase, a debit card purchase, and/or a debit account purchase, from a communication device 10 such as a telephone, a line-connected telephone, a cordless telephone, a wireless telephone, a cellular telephone, a personal computer, a personal digital assistant, and/or any of the other communication devices 10 described herein.

As described herein, the payment identifier information can include any one or more of a credit card number, a credit account number, a charge card number, a charge account number, a debit card number, a debit account number, and/or an expiration date.

The payment identifier information can also include information regarding an account holder which can include any one or more of an account holder's name or other identification information, an account holder's address, an account holder's residence information, an account holder's business address information, an account holder's telephone number, a telephone number corresponding to the communication account in conjunction with which the communication device is utilized, an account holder's e-mail address, an account holder's zip code, an account holder's mother's maiden name information, a password, a security code, and/or any other identification information which can be utilized in order to provide for account security for an account utilized for payment in a transaction.

In a preferred embodiment, the apparatus and method of the present invention can be utilized in order to transmit a payment command from a communication device 10 to a central processing computer 30 during a transaction involving a good or a service and/or a purchase of a good or a service. The central processing computer 30 can then identify the pertinent payment identifier information and transmit the payment identifier information to the merchant computer 20. The payment identifier information can then be utilized by the merchant computer 20 in processing the transaction information and/or in consummating the transaction.

In a preferred embodiment, the central processing computer 30 can be utilized in conjunction with a communication device 10 in order to provide an additional layer of security in the transaction. In another preferred embodiment, the central processing computer 30 can be utilized by a user or account holder who my desire to engage in a transaction with a merchant from a telephone or communication device which is not his or her communication device 10. For example, a user or account holder can use a telephone of a third party, a public telephone or kiosk, a computer of another, and/or any other communication device which may belong to a third party and/or which may not contain the user's or account holder's payment identifier information.

In a preferred embodiment, the central processing computer 30 and/or the communication device 10 can utilize a software program, an algorithm, or an applet, in order to retrieve the pertinent payment identifier information from the respective database 30G and/or 10H and transmit the payment identifier information to the merchant computer 20.

The merchant computer 20 can receive and process the payment identifier information in conjunction with information regarding the corresponding transaction. In this manner, the apparatus and method of the present invention dispenses with the need for a user or account holder to have to use his or her communication device 10 during a transaction and/or dispenses with the need for a user or account holder having to enter and/or input payment identifier information into the communication device 10.

In a preferred embodiment, the user or account holder can manually enter a payment command into the communication device 10 and transmit same to the central processing computer 30. The central processing computer 30 can thereafter transmit any pertinent payment identifier information to the merchant computer 20. In another preferred embodiment, the central processing computer 30 can be programmed to automatically transmit the payment identifier information to the merchant computer 20.

The payment identifier information which is transmitted from the central processing computer 30 to the merchant computer 20 can, for example, include any of the payment identifier information described herein. For example the payment identifier information can include any one or more of a user's name, a credit, charge, and/or debit, card number, a credit, charge, and/or debit, account number, a respective card or account expiration date, a mailing address, a security code, and/or any other payment identifier information described herein.

Figure 6A:
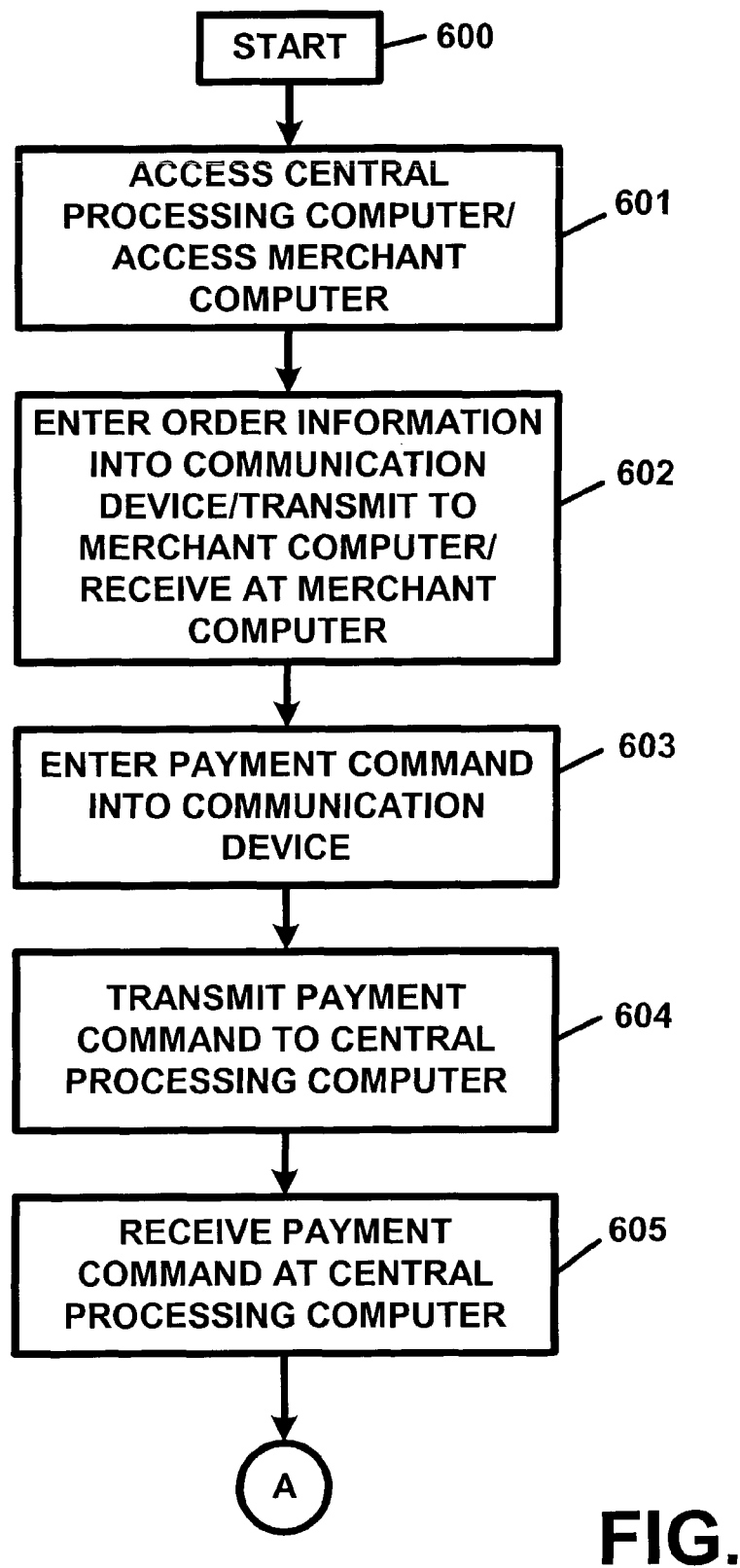
FIGS. 6A and 6B illustrate another preferred embodiment method for utilizing the apparatus of the present invention, in flow diagram form.
Figure 6B:
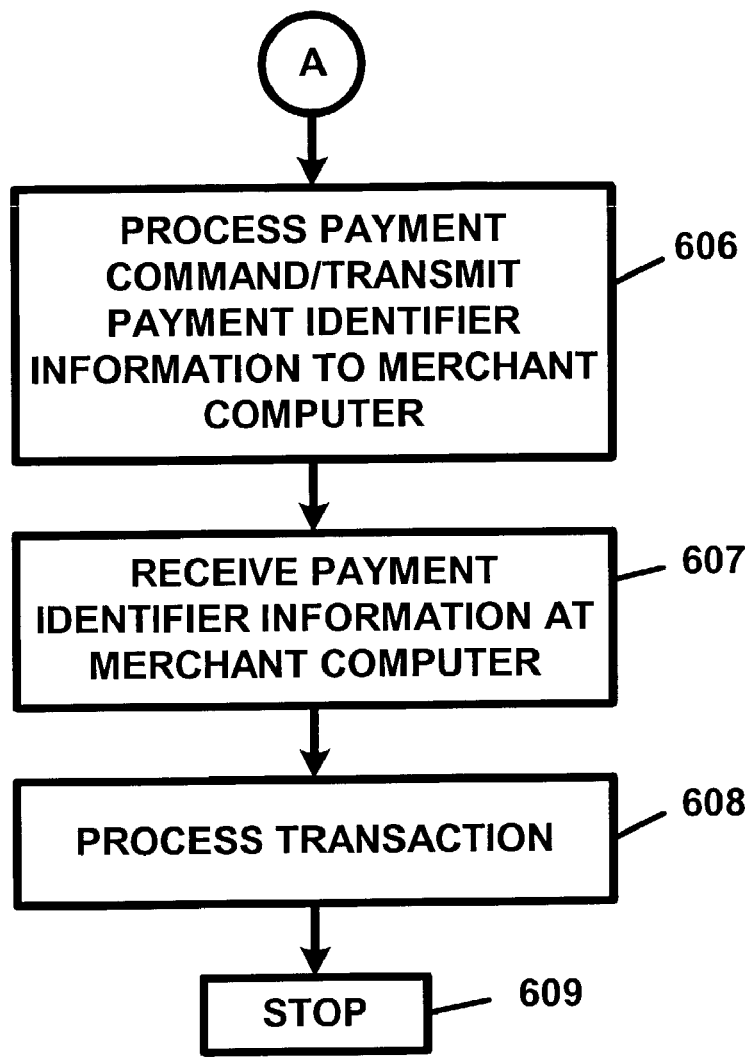

FIGS. 6A and 6B illustrate another preferred embodiment method for utilizing the apparatus 200 of the present invention, in flow diagram form. With reference to FIGS. 6A and 6B, the operation of the apparatus 200 commences at step 600.

At step 601, the user or account holder can access the central processing computer 30 and/or the merchant computer 20 with the communication device 10. In a preferred embodiment, the user or account holder can also access the merchant computer 20 via the central processing computer 30.

At step 602, the user or account holder can enter order information, regarding any good or service which he or she desires to order or purchase, into the communication device 10. At step 602, the communication device 10 can also process the order information. At step 602, the communication device 10 can transmit the order information to the merchant computer 20. In a preferred embodiment, the order information can be transmitted to the merchant computer 20 via the central processing computer 30. At step 602, the merchant computer 20 can receive and process the order information.

At step 603, the user or account holder can enter a payment command and/or payment command information into the communication device 10. In a preferred embodiment, at step 603, a user or account holder can request that the central processing computer 30 provide a pre-specified payment identifier to the merchant computer 20. In another preferred embodiment, at step 603, the user or account holder can enter information regarding a method of payment (i.e. credit, charge, debit, etc.) and an account which is to be utilized.

At step 604, the communication device 10 can transmit the payment command to the central processing computer 30. At step 605, the central processing computer 30 can receive the payment command.

At step 606, the central processing computer 30 can process the payment command, identify the pertinent payment identifier information, and retrieve the pertinent payment identifier information from the database 30G. At step 606, the central processing computer 30 can also transmit the payment identifier information to the merchant computer 20.

At step 607, the merchant computer 20 can receive the payment identifier information. At step 608, the merchant computer 20 can process the payment identifier information in conjunction with processing and/or consummating the transaction. Thereafter, the operation of the apparatus 200 will cease at step 609.

In the above-described manner, the apparatus and method the present invention can provide an electronic telephone wallet and/or a communication device wallet by utilizing any of the herein-described and/or other suitable telephones, communication devices and/or computers. The apparatus and method of the present invention can also be utilized in conjunction with a telephone and/or a communication device which is associated with a user or account holder and/or the apparatus and method of the present invention can be utilized in conjunction with any of the herein-described and/or any other suitable central processing computer(s) 30.

While the present invention has been described and illustrated in various preferred and alternate embodiments, such descriptions are merely illustrative of the present invention and are not to be construed to be limitations thereof. In this regard, the present invention encompasses all modifications, variations, and/or alternate embodiments, with the scope of the present invention being limited only by the claims which follow.

What is claimed is:

1. A method for making a payment by a user to a merchant, the method comprising:
   storing payment identifier information of the user at a storage device in a central processing computer;
   receiving from a wireless communication device of the user a payment command, the step of receiving being performed by the central processing computer;
   enabling the user to cause a payment corresponding to the payment command to be made to the merchant for processing a transaction of a purchase of a good or service without storing the payment identifier information at the wireless communication device;
   retrieving, in response to receiving the payment command by the central processing computer, the payment identifier information from the storage device in the central processing computer;
   transmitting to a merchant computer of the merchant, by the central processing computer, the payment identifier information retrieved from the storage device in the central processing computer, wherein the user requests the central processing computer provide a pre-specified payment identifier to the merchant computer; and
   consummating the transaction.

2. The method of claim 1, wherein the processing computer does not receive the payment identifier information from the communication device.

3. The method of claim 1, further comprising storing in the central processing computer payment identifier information for at least one account holder other than the user.

4. The method of claim 1, wherein the payment identifier information comprises an account number of the user, the account number being selected from the group consisting of a credit account number and a debit account number.

5. The method of claim 1, wherein the payment identifier information comprises expiration date of an account of the user.

6. The method of claim 1, wherein the payment identifier information comprises confidential information used to verify identity of the user.

7. The method of claim 6, wherein the confidential information comprises mother's maiden name of the user.

8. The method of claim 6, wherein the confidential information comprises a password.

9. The method of claim 6, wherein each of the steps of receiving and transmitting is performed at least in part over the Internet.

10. The method of claim 6, wherein each of the steps of receiving and transmitting is performed at least in part over a satellite communication network.

11. The method of claim 6, wherein each of the steps of receiving and transmitting is performed at least in part over a wireless communication network.

12. The method of claim 1, further comprising storing at the central processing computer information regarding the merchant and at least one other merchant.

13. A processing computer comprising:
   a storage device;
   a transmitter;
   a receiver; and
   a processing device coupled to the storage device, the transmitter, and the receiver;
   wherein the processing computer is configured to perform steps of a method for making a payment by a user to a merchant, the steps comprising:
   storing payment identifier information of the user in the storage device;
   receiving a payment command through the receiver, from a wireless communication device of a user;
   enabling the user to cause a payment corresponding to the payment command to be made to the merchant for processing a transaction of a purchase of a good or service without storing the payment identifier information at the wireless communication device;
   retrieving from the storage device, in response to the step of receiving, the payment identifier information;
   transmitting to a merchant computer of the merchant, through the transmitter, the payment identifier information retrieved from the storage device, wherein the user requests the processing computer provide a pre-specified payment identifier to the merchant computer; and
   consummating the transaction.

14. The processing computer of claim 13, wherein the processing computer does not receive the payment identifier information from the communication device.

15. The processing computer of claim 13, wherein the steps further comprise storing payment identifier information for an account holder other than the user.

16. The processing computer of claim 13, wherein the payment identifier information comprises an account number of the user, the account number being selected from the group consisting of a credit account number and a debit account number.

17. The processing computer of claim 13, wherein the payment identifier information comprises an expiration date of an account of the user.

18. The processing computer of claim 13, wherein the payment identifier information comprises confidential information used to verify identity of the user.

19. The processing computer of claim 18, wherein the confidential information comprises mother's maiden name of the user.

20. The processing computer of claim 18, wherein the confidential information comprises a password.

21. The processing computer of claim 13, wherein the receiver is configured to perform the step of receiving at least in part over a wireless communication network, and the transmitter is configured to perform the step of transmitting at least in part over the wireless communication network.

22. The processing computer of claim 13, wherein the receiver is configured to perform the step of receiving at least in part over a satellite communication network, and the transmitter is configured to perform the step of transmitting at least in part over the satellite communication network.

23. The processing computer of claim 13, wherein the receiver is configured to perform the step of receiving at least in part over the Internet, and the transmitter is configured to perform the step of transmitting at least in part over the Internet.

24. The processing computer of claim 13, wherein the steps further comprise storing at the processing computer information regarding the merchant and at least one other merchant.

25. A non-transitory memory device storing software for performing steps comprising:
   storing payment identifier information of a user at a storage device of a central processing computer;
   receiving from a wireless communication device of the user a payment command, the step of receiving being performed by the central processing computer;
   enabling the user to cause a payment corresponding to the payment command to be made to the merchant for processing a transaction of a purchase of a good or service without storing the payment identifier information at the wireless communication device;
   retrieving, in response to receiving the payment command by the central processing computer, the payment identifier information from the storage device of the central processing computer;
   transmitting to a merchant computer of the merchant, by the central processing computer, the payment identifier information retrieved from the storage device of the central processing computer, wherein the user requests the central processing computer provide a pre-specified payment identifier to the merchant computer; and
   consummating the transaction.

* * * * *